United States Patent [19]

Scherer

[11] Patent Number: 4,682,623

[45] Date of Patent: Jul. 28, 1987

[54] TOOL FOR REMOVAL OF DEBRIS FROM PIPE CONTAINING GAS UNDER PRESSURE

[76] Inventor: Jerome Scherer, 1020 N. Missouri, Cape Girardeau, Mo. 63701

[21] Appl. No.: 83

[22] Filed: Jan. 2, 1987

[51] Int. Cl.[4] .......................... F16K 51/00; B08B 9/04

[52] U.S. Cl. ................................ 137/317; 134/166 C; 137/152; 137/238; 137/318; 138/178

[58] Field of Search ............... 137/315, 317, 318, 323, 137/123, 153, 152, 238; 138/37, 178; 134/166 C

[56] References Cited

U.S. PATENT DOCUMENTS

| | | | |
|---|---|---|---|
| 1,181,910 | 5/1916 | McGilvray | 137/317 |
| 1,191,013 | 7/1916 | McGilvray | 137/323 |
| 1,953,525 | 4/1934 | Young | 138/177 |
| 2,073,311 | 3/1937 | May | 137/318 |
| 2,617,205 | 11/1952 | Cram | 137/152 |
| 3,948,283 | 4/1976 | Asfura et al. | 137/152 |
| 4,155,372 | 5/1979 | Mills et al. | 137/317 |
| 4,282,894 | 8/1981 | Mills et al. | 137/317 |
| 4,345,613 | 8/1982 | Mills et al. | 137/318 |

*Primary Examiner*—George L. Walton
*Attorney, Agent, or Firm*—Paul M. Denk

[57] ABSTRACT

A tool for removal of debris from within a transmission pipe containing gas under pressure, including, a slide tube, having an angled fitting provided at its bottom end, and generally for disposition within the transmission pipe, said slide tube extending through a reducer, that incorporates and includes therein a mounting member, such as a swivel ball, through which the slide tube locates, and has a hermetic seal therewith. The slide tube 2 at its upper end includes one or more shut-off valves, and may also incorporate a filter device, for collecting of the accumulated debris that is carried with the pressurized gas as it rapidly passes through the slide tube, after opening one or both of the shut-off valves. The slide tube generally mounts within the reducer, with the application of a pair of fittings, that cooperate with valve seats, for compressing against the swivel ball, to prevent the by-passing of any pressurized gas therepast, when the various shut-off valves are opened, for discharge of gas entrained debris, or even when the shut-off valves are closed, to prevent any further passage of the pressurized gas from the transmission pipe in which the pressurized gas is conveyed.

13 Claims, 7 Drawing Figures

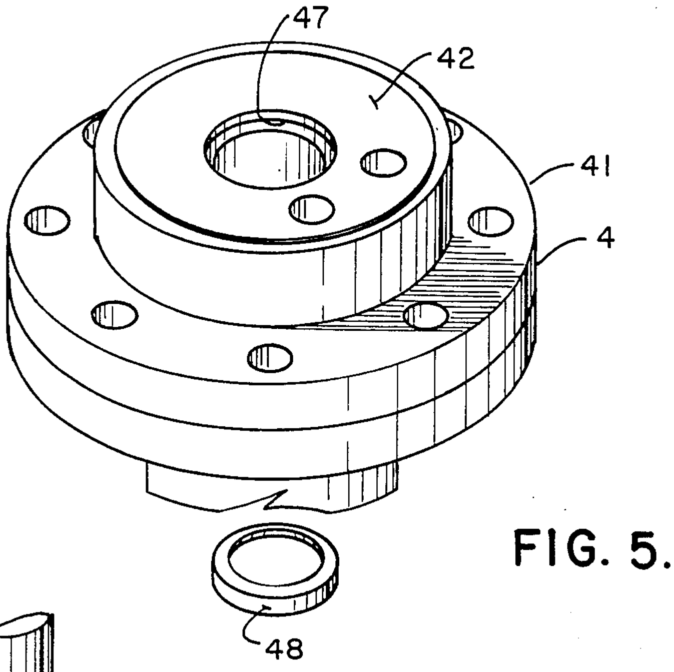
FIG. 5.
FIG. 4.
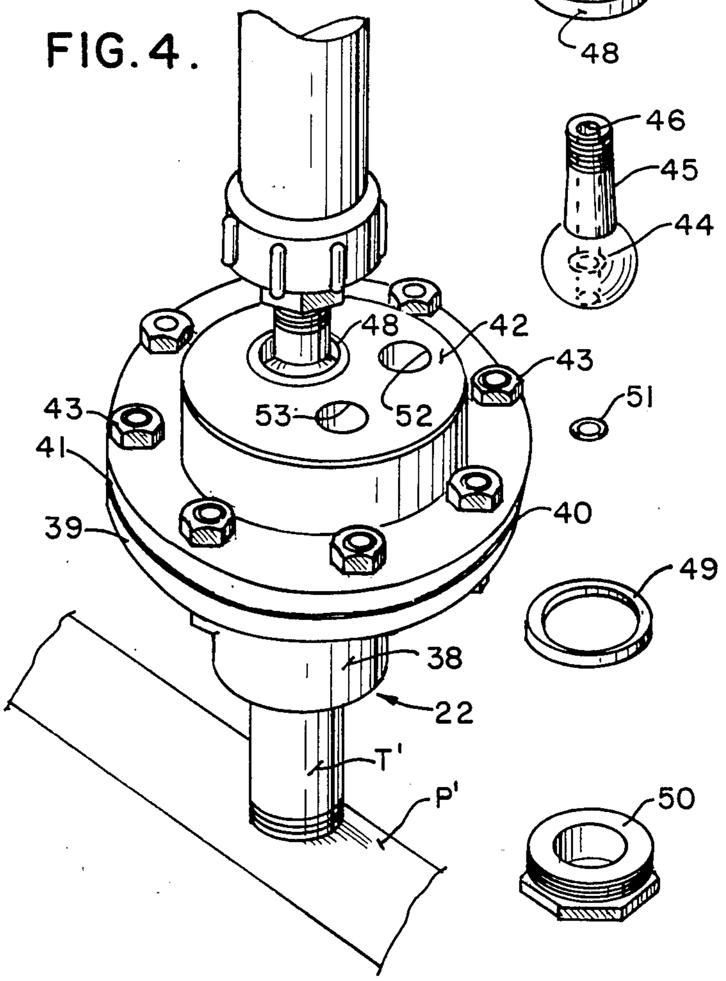

TOOL FOR REMOVAL OF DEBRIS FROM PIPE CONTAINING GAS UNDER PRESSURE

BACKGROUND OF THE INVENTION

This invention relates principally to a tool that is very useful for application in the removal of drill cuttings, liquid, greases, and any other substance of material that may collect within a transmission pipe, particularly at those locations where tapping has been made into the pipe for application of a service tap, branch line, or other pipe line.

In the servicing of transmission lines, particularly those that convey gas or other materials under pressure, as one can readily understand, it becomes a rather difficult task to accomplish tapping into the line in order to install a service tap, branch line, or the like, for redistribution of a part of the gas to another location for consumption. The routine example of this relationship is in the transmission of natural gas, under significant pressure, to a residential area, through its primary transmission line, and then installing service taps at each location where a residence is to have delivered a quantity of natural gas for consumption. Heretofore, the usual procedure for accompishing the connection of such a tap was simply to secure a service tee onto the line, and once installed, a drilling or boring into the transmission pipe was made. The drill means would then be removed, after shut-off of an attached valve, and a service line connected, and with the valve then being opened, provide for transmission of natural gas to the adjoining residence or building. But, as can be readily understood, when drilling initially into the transmission pipe was undertaken, and regardless whether the pipe was formed as of a metal, polymer, or of any other material, shavings and filings, and other drill cuttings, would be deposited into the transmission pipe, at the situs of its tap. Eliminating that type of debris from within the transmission pipe, to the inventor's knowledge, has never been accomplished, other than through the use of a magnet, and with such debris being allowed to remain within the pipe, and either to become clogged in proximate fitting threads, or it eventually becomes entrained within the pressurized gas, and flows along with it, to eventually become a source of contamination, which may detrimentally block other valves, particularly when shut-off is attempted. Or, it is even conceivable that such debris is carried along even to the source of usage of the gas, whether at an industrial site or residence, and could detrimentally harm the controls, valves, and other instruments associated with the use and consumption of the natural gas within the identified serviced structure.

It is, therefore, the principal object of this invention to provide means for removål of debris at the location of a tap so as to prevent contaminants such as drill cuttings, or the like, from harming the operating instruments utilizing the gaseous pressure.

Another object of this invention is to provide a tool for removal of debris from a transmission or other pipe through which gas, liquid, or other fluids traverse under pressure.

Still another object of this invention is to provide means for accommodating the tap servicing tools, such as the drill means, while at the same time allowing for the installation of a service tee to a transmission line conveying materials under pressure.

Still another object of this invention is to provide a tool for use in removal of cuttings from tapped lines.

The device of this invention is also useful for the removal of cutting greases applied during tapping of transmission or other lines.

Another example of the usefulness of this tool is in the application on pipe line stopper fittings where the pipe has to be cut or drilled through both its top and bottom, and it becomes necessary to furnish a stopper through the pipe for the purpose of making a complete seal on both of its top and bottom taps before a service tap installation is made.

Still another object of this invention is to provide a service tool which is useful for tapping into a transmission line, and incorporates a variety of valve means, each of which is designed to provide for its opening or shut-off at particular times in order to initially provide for a tapping of the line through application of a drilling instrument, and with said valves being further manipulated, in sequence, to subsequently provide for removal of the debris generated as a result of such tapping, line cutting, or the like.

Another object of this invention is to provide a tool for removing debris from any transmission line, regardless whether such line may be used for conveying natural gas under pressure, a water line, or a pipe that transmits any type of materials under significant pressure, and generally that above ten pounds or more psi.

These and other objects will become more apparent to those skilled in the art upon reviewing the summary of this invention, and upon undertaking a study of the description of its preferred embodiment, in view of the drawings.

SUMMARY OF THE INVENTION

This particular invention provides a tool that is very useful for application in removal of drill cuttings, liquid, grease, or any other substance of material from the bottom, or any other interior surface that is accessible within a pipe, or pressurized vessel, such as a natural gas line, or the like. The principal attribute of this invention is for use for removal of debris, such as drill cuttings, from the interior of a pipe line through which pressurized gases, or the like, flow, and which cuttings may accumulate during the application of a service tap, branch line, or the like, to the pipe line, and which cuttings, if not removed, may eventually cause clogging and damage to the various instruments and valves that operate downstream from the situs of said connection, as previously reviewed. It is the introduction of the pressurized gas into the tool of this invention, after its application, that causes a suction which attracts such cuttings into this instrument, to achieve an immediate and rather highly effective removal of such collected debris from the pipeline. In general, the various components of this particular invention include a tube means, such as a stainless steel tube, that connects to a reducer, and which reducer incorporates a fitting, formed of a pair of bushings, and uses strategically located O-rings, so that the tube in its mounting through the swivel is sealed in connection therewith, so as to prevent the escape of pressurized gas around the tube, or around the swivel ball, after the instrument has been installed onto a pipe line, and after the service tap hole has been drilled therein. This tube at its lower end incorporates another fitting, such as an angled fitting, which provides for an entrance port into which the debris will be drawn into or sucked as a result of the pressurized gas achieving a rapid escape from the pipeline, through the tool of this invention, when its various valves are opened.

Usage of this particular tool is quite necessary on pipe lines that do not incorporate debris traps that prevent drill cuttings from entering pressure reducing regulators, pumps, valves, or other instruments, generally associated with the transmission of the pressurized gas, or its usage and consumption within an industrial building, other structure, or residence. Furthermore, it is also necessary through the use of this tool to remove cuttings and other filings from the inside threads of a line tap fitting, in order to prevent cross threading, when the completion plug is installed, and which may further provide leakage, which is certainly undesired in the handling and conveyance of natural or other gases. This particular instrument is needed when making such service taps, branch connections, line stoppers, insulated fittings, the installation of cut-in valves, or whenever a shell cutter or drill is used on pipe lines or pressurized vessels, generally of ten pounds or more psi. This device is also useful for the removal of cutting greases, or other deleterious materials, that may inadvertently enter into the pipe line during installation, of the aforesaid type of connections.

An example of when this tool is useful in application would be on a pipeline stopper fitting where the pipe has to be cut or drilled through the top and bottom of the pipe, and there is a bowl on the bottom of the fitting to allow the stopper to extend into it and thereby allow the stopper to make a complete seal on the top and bottom of the pipe. In the event that the stopper fitting has been in service for a period of time, the bowl on the bottom of the fitting will normally be filled with debris. Should one try to insert a stopper in the fitting again, the debris in the bowl will generally not allow the stopper to be inserted deep enough to make a complete seal around that bottom of the pipe.

On insulator fittings where a pipe is completely cut, as the shell cutter or drill is cutting through the pipe, the cutting grease generally gets mixed with metal cuttings or shavings, and the cuttings in the grease get jammed between the insulator fitting and its pipe, thus undesireably maintaining continuity between the pipe and fitting. This invention can be used on any type of liquid line, and other fluid flow lines.

Upwardly in the installation of the tube of this tool during application, there may be provided one or more shut-off valves, which are useful for manipulating the control of this tool during its application, such that after the tool has been installed, and ready for usage, one or more of these fittings may be opened, to allow for a controlled discharge of pressurized gas, in which the debris will be entrained, to be discharged to the atmosphere, or into a filter means for collection, during removal of such debris. In addition, since the tube of this tool will have been installed within a swivel ball, or other mounting means, turning of the tube during application, so as to orient its angled fitting, or intake port, in the direction of the located debris, can be easily accomplished by the worker, in order to assure that all of the debris gathered within the transmission pipe can be removed. In addition, since the mounting means of this invention may include the swivel ball, it is further likely that the tube can be manipulated at reasonable angles, as much as ten to fifteen degrees off the vertical, depending upon the size of the pipe reducer, so that it can be extended into closer proximity with any debris located within the transmission pipe. In addition, the reducer, particularly that one of larger size, may include one or more sight tubes, in which a sight glass may be located, so that the operator can have visual line of sight towards the collected debris, within the transmission pipe, and observe that the removal of the debris is being effectively accomplished. In addition, where a pair of sight glasses are located within the reducer, a flash light of other light means may be directed through the second sight means, in order to illuminate the interior of the reducer, and the transmission pipe, so that the operator can readily observe and be assured that debris removal, such as the attraction of the drill cuttings, filings, and collected grease, is being efficiently performed.

BRIEF DESCRIPTION OF THE DRAWINGS

In referring to the drawings, FIG. 1 provides a side view of one embodiment of the tool of this invention as mounted upon the service tee and transmission pipe useful for conveyance of fluid or gas under pressure;

FIG. 4 is a partial view of the tool generally shown in FIG. 3, disclosing an isometric view of the incorporated pipe reducer;

FIG. 5 is an exploded view of select components of the tool as shown in FIG. 4;

DESCRIPTION OF THE PREFERRED EMBODIMENT

Figure 1:
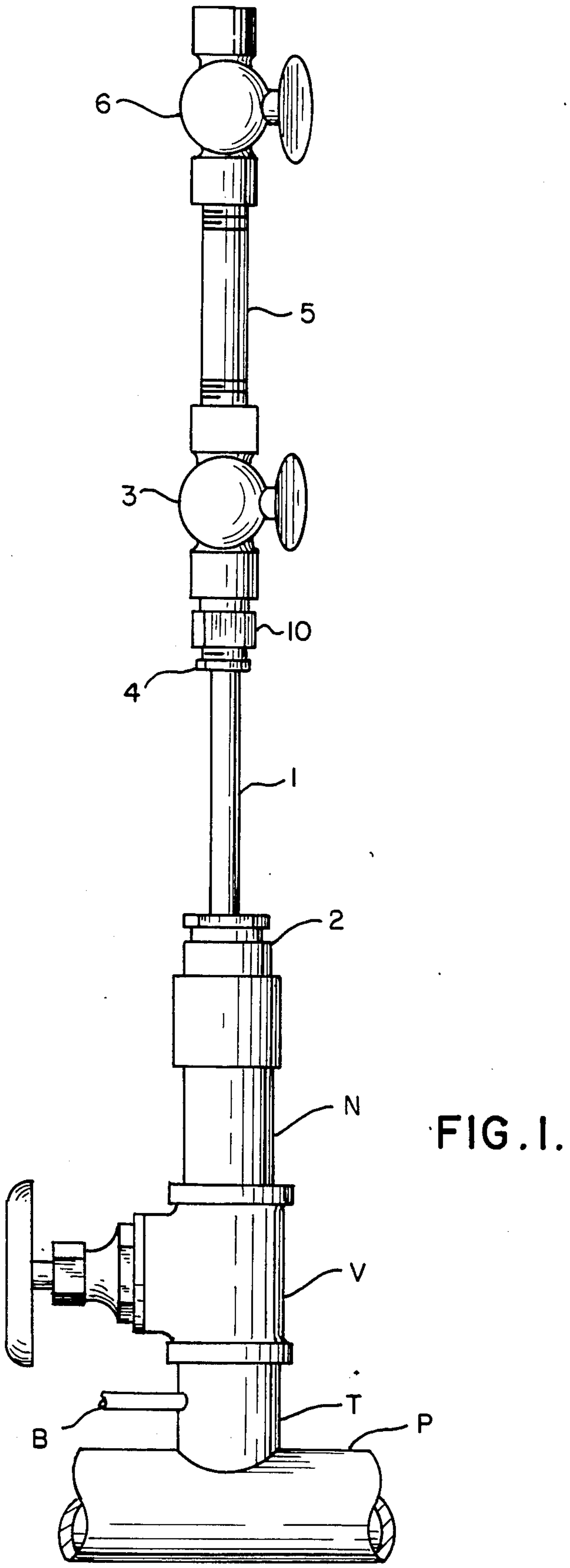
Figure 2:
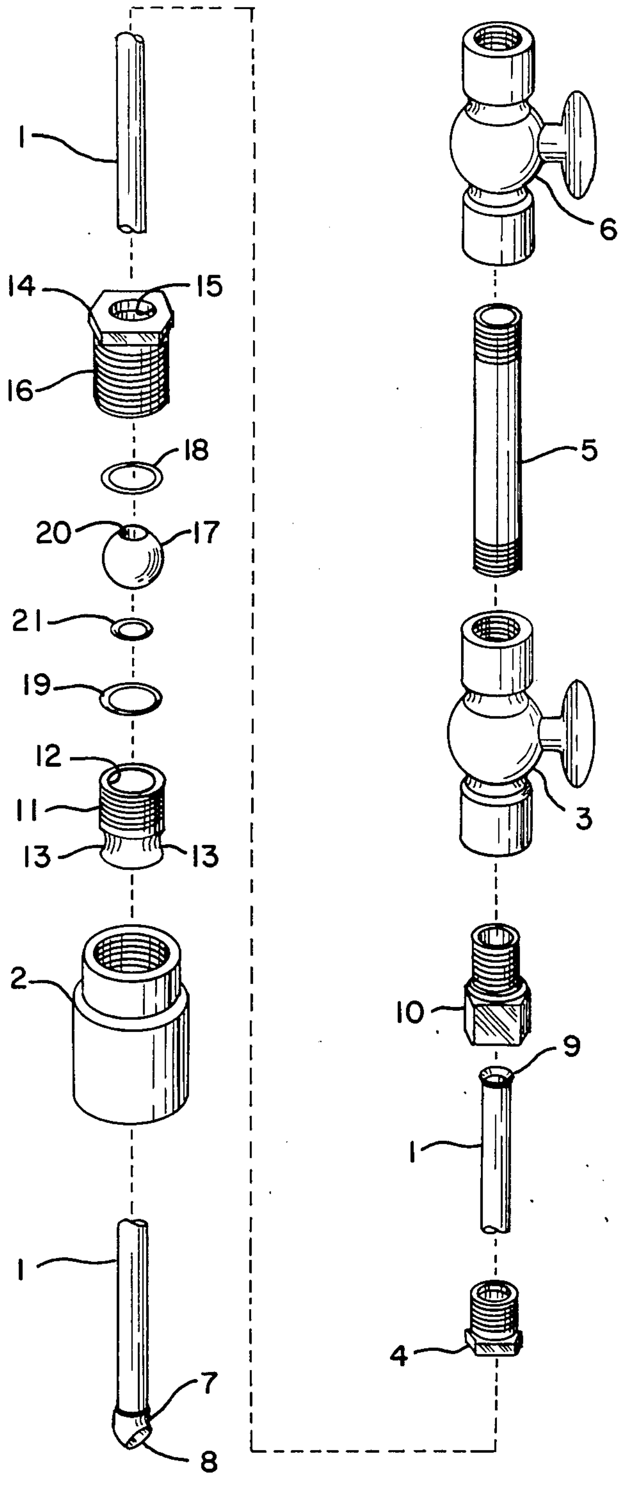
FIG. 2 provides a vertically aligned exploded view of the various components forming the tool generally as shown in FIG. 1.

In referring to FIGS. 1 and 2 of the drawings, the tool of this invention is readily disclosed. As noted, the tool is installed upon a transmission pipe P, or more specifically on its service tee T and to which a manually operable shut-off or tapping valve V is installed. A nipple N connects with the valve V. The transmission pipe P may be of the type that is formed of plastic, metal, or other types of material that is customarily used in the manufacture of such piping.

The tool of this invention incorporates a tube means 1, which may preferably be formed of stainless steel, or of related materials, and which is reasonably strudy in assembly, but yet easy of manipulation during application. Tube means 1 connects with a pipe reducer 2, with the assembly of the various components with the reducer to be subsequently explained. The upper end of the tube means 1 may include a valve fitting 3 connecting with the valve through a female flare fitting 4, and, in addition, a pipe nipple 5 connects to the opposite end of the valve 3. Futhermore, there may be another shut-off valve 6 connecting with the upper end of the nipple 5, and useful for manipulating and regulating the discharge of the pressurized gas or fluid from out of the transmission pipe P, when the tool is applied for removal of debris, and the like, from within the same.

In also referring to FIG. 2, the tube means 1 extends through the reducer 2, with the reducer being mounted upon the shown nipple N and its service connection T, as noted. The lower end of the tube means 1 extends downwardly, through the service tee T, and incorporates at its downward end an angled fitting 7, having an intake port 8 that may be conveniently oriented in the direction of any deposited debris, in order to assure its alignment, and removal of such debris, from the transmission pipe P, during application of the tool of this invention.

In the particular construction of this tool, its tube means 1 may have a flared upper end, as at 9, and which may be held by means of the male follower 4, within the female flare fitting 10, which in turn, securely mounts the tube means to the shut-off valve 3, proximate its upper end.

The usefullness of this invention, and its integral construction, is also aptly shown in FIG. 2, and that is the means and method by which the tube means 1 mounts within the pipe reducer 2. Obviously, the various sizes and dimensions for the various components that are constructed into the tool of this invention, are not necessarily critical, since the entire tool may be fabricated for mounting onto various size pipes, and must be appropriately and accordingly sized in order to accommodate its proper functioning within transmission lines of various dimensions, and which also depends upon the pressure of the gas or other fluid being transferred therethrough. In addition, and as will be subsequently noted, the size of the reducer 2, will depend upon the make up of the tool, and the degree of precision desired and required for its application and usage. For the particular reducer as shown herein, it is a one-half to three-quarter inch N.P.T. sized reducer.

The fitting secured within the reducer that is useful for providing the minor degree of angulation to the tube means 1, during its manipulation and usage, comprises the bushing 11, which has a threaded upper portion, as can be noted, with this bushing generally being identified in its specific installation as comprising a three-eight inch N.P.T. follower. It incorporates an opening, as at 12, therethrough, and through which the tube means 1 freely inserts. In addition, there are provided a pair of aligned apertures 13 through the lower end of the bushing, and through which a spanner wrench, or the like, can be applied, during installation of this bushing follower into the reducer 2. As can be seen, the reducer 2 also contains a threaded interior, for accommodating the threaded engagement therein of the bushing 14, at least at its upper internal portion. In addition, there is also provided a bushing 11 that is disposed for threading upwardly within the bushing 14. The bushing 14 incorporates an aperture of approximately three-eight inch inside diameter, as at 15, as well as at 12, and through which the tube means 1 conveniently inserts. The downward portion of the bushing 14 includes a series of threads, as at 16, for threadily engaging within the upper portion of the reducer 2. The purpose of the two bushings 11 and 14 is for mounting of the mounting means, or swivel ball 17, intermediate and within these components and within the reducer 2. To provide for its snug engagement therein, a pair of seals, such as the upper and lower O-rings 18 and 19, respectively, secure against the swivel ball 17, to provide for its sealing engagement. This prevents the escape of pressurized gases therepast. Obviously, the gases are exposed to the underside of the swivel ball 17, through the relationship of the reducer 2 mounting upon the tapping tee T, as can be seen in FIG. 1. In addition, to assure that pressurized gases do not by-pass the outer surface of the tube means 1, where it inserts through the swivel ball 17, the interior of the swivel ball includes a channel, as at 20, as can be noted. At the approximate mid point of the interior of the swivel ball 17, there is provided a groove (not shown), and within said groove another O-ring, as at 21, inserts. And, snugly inserting through the swivel ball 17, and the O-ring 21, is the tube means 1, which is hermetically sealed interiorly of the said mounting means 17, to prevent any gasses from escaping at this location.

In practice, as can be noted, once the tool of this invention is mounted onto the branch tee T, and installed for operation, all the operator need do is to forcefully lower the tube means 1 through the mounting means 17, until such time as the lower inclined angled fitting 7 of the tube comes into proximity with the bottom of the transmission pipe P. Then, the tube can be either pivoted in place, so as to orient its angled intake port 8 in various directions and universally about a three hundred sixty degree movement at the bottom of the said pipe P. In addition, the tube means 1 being mounted through the swivel ball 17, has yet some additional angular play, along the vertical axis, that it may be manipulated into in order to add to the dexterity of the positioning of the tube means 1, and its angled fitting 8, at those directions to provide for the easy attraction of any debris into and through the same, when its valves 3 and 6 are opened, and allowing for the rapid discharge of a sampling of the pressurized gas therethrough, which as such occurs, and as can be readily understood, will also cause an entrainment and attraction of any proximate debris into and through the tube means 1, for discharge of such collected debris.

While the angled fitting 8 may disclose a single intake port, this port may have an approximate five-sixteenth inch inside diameter, arranged at approximately a fifty degree angle. The fitting may be silver soldered to the end slide tube means 1. On the other hand, it is conceivable that an additional intake port may be provided at the back side of the fitting 7, and perhaps for a dual collection, at the same time, of any debris accumulated at the bottom of the transmission pipe P.

An additional method of operation of the tool of this design, as shown and explained, includes the valve 3 being maintained open. The valve 6 should be opened enough to allow for the desired pressurized air or gas, and entrained debris, to flow therethrough. Should this valve become jammed with debris, the valve 3 may be shut off. At this stage, the debris may be collected within the pipe nipple 5, at which time the valve 6 may be fully opened. Then valve 3 must be opened enough to clear the collection chamber or nipple 5.

Figure 3:
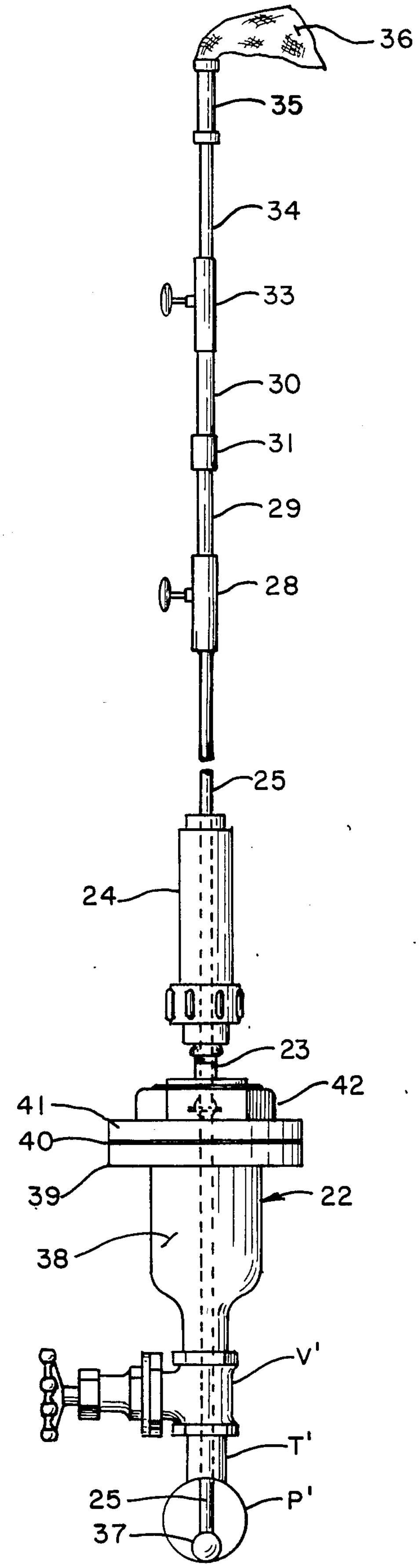
FIG. 3 shows another modification to the tool of this invention and incorporating an enlarged reducer, in addition to a balanced pressure chamber, and filter bag, for enhancing the efficiency of operation of this tool, particularly when used upon transmission lines conveying high pressure gas.

In referring to FIGS. 3 through 5, a modification to the structure of the tool of this invention is disclosed. In this particular instance, the tool is more aptly for use in conjunction with a more high pressure gas flow line, such as the transmission pipe $P^1$, as noted. Connecting to it is the service tee $T^1$, or line stop fitting, in addition to the shut-off valve $V^1$. Attaching to the outlet side of the valve $V^1$, is a reducer 22 whose structure will be more aptly defined, but generally includes an enlarged reducer, and for purposes to be subsequently described. Extending upwardly from the reducer is a fitting 23, and mounted to the upper end of said fitting is a balanced pressure chamber 24 of the type that is generally used with pressure vessels that operate in a range in excess of one hundred psi. This type of balanced pressure chamber is readily available from a company such as Mueller Company, of Decatur, Illinois, or T.D. Williamson Co. of Tulsa, Oklahoma. Extending through the balanced pressure chamber, and the fitting 23, is the slide tube means 25 of this invention. It extends upwardly through the valve 28 and is held into position to the shut-off valve 28 by welding thereto. A pair of pipe niples 29 and 30 are held together by a junction 31, and connect by means of welding to the shut-off valve 33. Another nipple 34 connects therewith, and also connects to a further fitting 35 which is useful for attachment with the filter bag 36 that effectively eliminates debris from the conveyed pressurized air as it is released through the tube means 25, for removal and discharge of any debris from within the pipe $P^1$. There can be seen disposed within the pipe $P^1$ that the lower end of the slide tube means 25 has its angled fitting 37 arranged having its intake port oriented for collection of any debris, shavings, filings, cuttings, grease, and the like, that are absorbed therein during application of this tool.

It might be commented that the fitting 37 is removable to facilitate the replacement of any worn out O-rings, or other components, or if it is desired to remove the balance pressure chamber from the working tool and its slide tube. The tip fitting may be soldered, or set screw held. The latter for ease of removal.

The specific construction of the reducer 22 is more aptly shown in FIGS. 4 and 5, and includes its reduced lower portion, as at 38, which has integrally formed at its top end thereof a flange 39. This is a threaded type 4 inch pipe flange. A gasket as at 40 is arranged intermediate the flange 39 and the upper flange 41, with said upper flange 41 being integrally formed with its boss member 42. A series of bolts, as at 43, secure the two flanges, and the upper and lower parts for the reducer 22, together. Mounting within the upper housing or boss means 42 and its integral flange 41 is the mounting means 44, which in this particular instance comprises a swivel ball, as can be seen, and extending integrally from the upper end of the swivel ball 44 is its stem 45. A channel 46 extends through through the swivel ball 44, and it is through this channel that the slide tube 25 inserts. Seated within a formed shoulder, as at 47 provided internally of the housing 42 is a tapered ball seat 48 and it snugly embraces the upper surface of the swivel ball 44, when it is installed into position. A lower tapered ball seat 49 biases against the undersurface of the ball means or swivel ball 44, and is firmly held into position by means of the retainer bushing 50. This retainer bushing threadily engages within the interior bottom surface of the boss 42, when locking the swivel ball into its installed operating position. Set screws may further retain the bushing in place. Once again, interiorly of the swivel ball 44 there is provided a groove (not shown), and within said groove the O-ring 51 mounts, for accomodating the snug and hermetically tight disposition of the slide tube 25 therethrough.

Provided through the housing 42 are a pair of cavities 52 and 53, with sight glasses being sealed within each cavity, so that the operator of the tool may observe through one of the sight glasses, as at 52, while holding a flashlight at the other sight glass, 53, to observe the results of his manipulation of the slide tube means 25, when collecting and attracting debris resting upon the bottom of the transmission pipe $P^1$. These sight glasses may be hermetically sealed in their installation within the housing 42, in any manner that is customary in the art for sealing and constructing sighting means of this type within instruments, and under hermetically tight and pressurized conditions.

As can be seen, all the operator need do is simply manipulate the various shut-off valves in the manner as previously explained, and in this particular instance, may hold the balanced pressure chamber 24, and the various nipples, while manipulating the slide tube 25 downwardly and adjust its angled fitting 37 into proximity againstd the approximate bottom of the transmission pipe $P^1$. When this is achieved, the slide tube can be turned slowly, around a full circle, in order to collect any debris in the form of drilling chips, shavings, and the like, that have come to rest upon the bottom of the transmission pipe. Likewise, a forceful manipulation of the nipples and slide tube 25 will provide for its angulation, through reorientation of the swivel ball 44 within its seating arrangement, so as to slightly angle the tube 25 at various positions, in order to more conveniently align and collect the more peripherally arranged debris that has collected at the bottom of the said transmission pipe.

Figure 7:
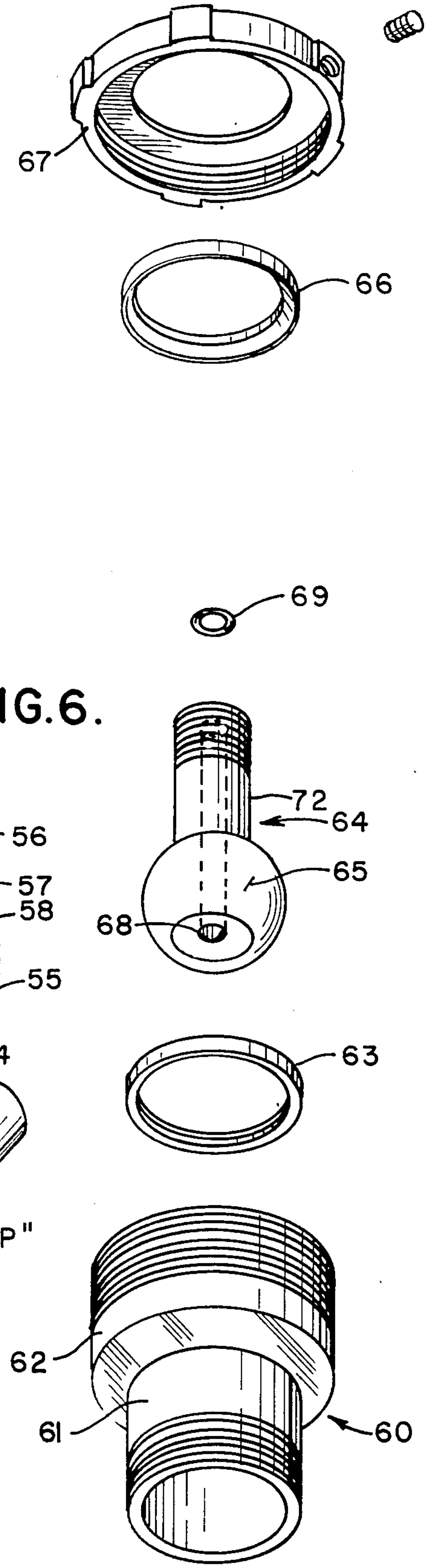
FIG. 7 is an exploded view of part of the components embodied within the tool structure shown in FIG. 6.
Figure 6:
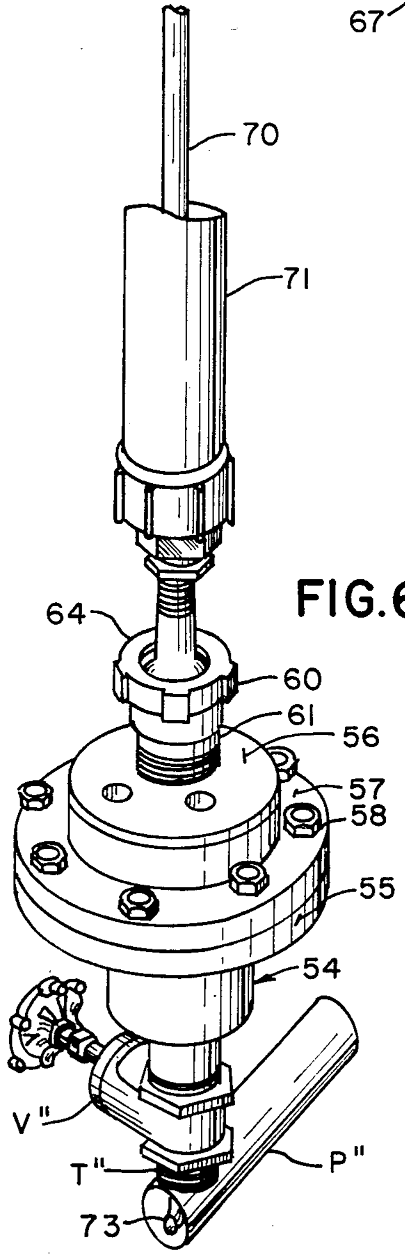
FIG. 6 is a partial view of another form of the tool as applied through its reducer to a pipe line installation.

A variation upon the tool of this invention is shown in FIGS. 6 and 7. Once again, it is designed for mounting upon the transmission pipe $P^{11}$, having a service tee $T^{11}$ secured thereon, and a shut-off valve $V^{11}$ connecting therewith. In this particular instance, the reducer 54 includes its lower narrowed portion 55 that threadily engages into the shut-off valve $V^{11}$, while its upper segment is integrally formed with its flange 55. The upper portion of the reducer is formed having its housing 56 with integral flange 57 rigidly secured by means of the fasteners 58, comprising nut-and-bolt combinations, for holding the reducer into position. A pair of sight glasses 59 is provided and constructed in the manner as previously explained. The purpose for this particular embodiment is to provide a double reducer installation, and in this particular embodiment, threadily engaging within the housing 56 is a second reducer 60 having its lower diametered sleeve 61 threadily engaging within the housing 56. The upper formed sleeve 62 of the reducer forms a ball joint housing, and seats internally thereof, as upon the shoulder formed at the top edge of the sleeve 61, the tapered ball seat 63. The mounting means 64, comprising the swivel ball 65, snugly rests upon the tapered ball seat 63, while another and upper tapered ball seat 66 biases against the upper surface of the swivel ball 65, and is held into position by means of the set screw and threadedly retained pressure retainer cap 67 that biases against the seat 66 for pressing the swivel ball 65 into a hermetically sealed seating relationship within the reducer, or ball joint housing 60, previously defined. Since there is a channel 68 that extends through the swivel ball 64, there is a groove (not shown) for mounting of the O-ring 69 therein, for providing a tight seal against the slide tube means 70, as it extends downwardly through the balanced pressure chamber 71, into and through the swivel ball 64, and its upper extending stem 72, for downward extension into the transmission pipe $P^{11}$, for disposition of its angled fitting 73, as noted, disposed within the said transmission pipe.

The advantages of constructing the tool in the manner as herein described is that the swivel ball 64, and its mounting to the reducer 60, is separate from the location of the sight glasses 59 within the reducer 54, so that a more clear path for viewing by the workman through to the location of the accumulated debris within the transmission pipe $P^{11}$ can be more readily observed. This facilitates the usage and application of this particular instrument.

This particular instrument removes debris when used and applied on any pressurized gas line, on any gas service line, or on any valve means, a gas line tap, a water line tapping junction, or any cast iron, plastic, or other material forming a water line, with this particular device being very effective in preventing the cuttings and shavings from entering any damaged faucet valves, water closet valves, gas valves, or the like. Any balanced pressure chamber, hydraulic chamber, or mechanical feed screw can be built into this equipment, particularly for use in vessels containing gases or fluids that exceed one hundred psi. This device can also be mounted in a blind or blank flange near a sight glass so that the effectiveness of the results obtained can be readily observed during the tool's application. The instrument of this invention is applied to a tapping valve on a service tap or branch connection, or for application onto the main pressurized gas or fluid pipe line, and is useful and effective for eliminating that generated debris therein. With the tool installed, the bottom of the slide tube, and its angled fitting, are generally disposed interiorly of the main pipe line, obviously cannot extend beyond the bottom of the pipe line, nor can they be withdrawn above the swivel ball mounting means, as previously explained. The tube can be manipulated, partially or fully swivelled, for disposition of its angled intake fitting at various locations along the bottom of the flow pipe, and therein can pick up any debris particularly when the various valves, as previously described, may be opened, and thereby allowing the pressurized gas or fluid to rapidly enter into and escape from the slide tube, and carrying with it any of the proximate debris. It is believed that nothing like this has ever been previously achieved.

It should also be noted that the effectiveness of this tool exhibits utility not only in its application for removal of debris from the transmission pipe, but likewise, its base structure can be used also in conjunction with the instrumentalities, or drills, used for initially drilling the transmission pipe, to attach a service tap, in the first instance. For example, as can be seen in FIG. 1, once the service connection T, with its shut-off valve V, have been installed, the valve V can be closed. At this juncture, before the reducer 2 is applied to the service tee, a drilling means may be fastened thereon, at which juncture, the valve V can then be reopened, and the drill actuated for drilling a tapping hole through the transmission pipe P. The drill is once again withdrawn, at which juncture, the valve V is once again closed. At this time, the drill instrument may be removed, and the reducer 2 applied, with its slide tube 1 in place, and ready for operation and functioning for removal of the debris in the manner as previously analyzed in this application. Obviously, as the slide tube 1 is lowered, the valve V will be opened, to accomodate the passage of the tube therethrough, and into the transmission pipe P. When the debris is fully removed, the slide tube is once again withdrawn, the valve V is closed, and the reducer 2 removed. Following this, the service branch will be applied in the manner as normally done when tapping onto a transmission pipe P.

Variations or modifications to the structure, usage and operation of this invention may occur to those skilled in the art upon reviewing the invention described herein. Such variations or modifications, if within the spirit of the invention described herein, are intended to be encompassed within the scope of any claims to patent protection issuing upon this development. The description of the preferred embodiment set forth herein is done so for illustrative purposes only.

Having thus described the invention what is claimed and desired to be secured by Letters Patent is:

1. A tool for removal of debris from a transmission pipe containing a gas under pressure, comprising, a tube means, said tube means having an opening at one end, and which end and its opening are provided for disposition into the pipe containing the gas under pressure, and functioning to discharge any debris contained within the pipe through its coneyance with the pressurized gas as it releases through the tube means, a pipe connector attaching with said pipe, a reducer securing with said pipe connector, a fitting securing within said reducer, a movable and universal mounting means seated within said fitting, said tube slidably mounted within said mounting means, whereby the shifting of said tube means within said mounting means, providing for a universal movable arrangement of the said tube and its opened end for alignment with any proximate debris within and along the bottom of the said pipe and effecting its removal through its entrainment within any pressurized gas discharged through the said tube means.

2. The invention of claim 1 and wherein said mounting means comprising a swivel ball, whereby the shifting of the said tube means within said swivel ball, and swiveling of the said ball arranges the said tube means and its opened end for alignment and disposal of any pipe contained debris.

3. The invention of claim 2 and including a shut-off valve coupling with said pipe connector and disposed for precluding the escape of pressurized gas from the transmission pipe during installation of the tube means, and providing for its opening and release of pressurized gas and internal debris through said tool during its application.

4. The invention of claim 3 and including another shut-off valve provided within said tube means and when opened allowing a discharge of pressurized gas and debris through said toolsion pipe.

5. The invention of claim 4 and wherein said first shut-off valve provided for prevention of release of pressurized gas during installation of said tube means, reducer and fitting, and said second shut-off valve provided for discharge of gas and debris from the transmission pipe during tool application.

6. The invention of claim 5 and wherein said swivel ball allowing said tube to be manipulated into various angular positions within the transmission pipe to facilitate the discharge of debris located therein during tool application.

7. The invention of claim 6 and wherein said reducer having a sight glass provided therein to accommodate viewing internally of the transmission pipe to facilitate the alignment of the tube means and its open end to effect removal of any debris contained therein.

8. The invention of claim 7 and including another sight glass provided within said reducer for directing light into said pipe for facilitating the sighting and removal of any debris from within the transmission pipe.

9. The invention of claim 2 and wherein said fitting including a first bushing disposed within said reducer and forming a lower seat for the said contained swivel ball, a second bushing disposed within said reducer and forming an upper seat for the said contained swivel ball, whereby said swivel ball being hermetically sealed within said fitting to prevent the escape of pressurized gas there past.

10. The invention of claim 9 and including a pair of seals, one arranged adjacent each bushing for hermetically sealing the fitted swivel ball within the said reducer.

11. The invention of claim 10 and including a seal provided within the swivel ball and contiguous of and surrounding the tube means to provide a hermetic seal thereat.

12. The invention of claim 1 and including a filter means provided at the opposite end of the said tube means for collection of any debris discharged from the transmission pipe during application of said tool.

13. The invention of claim 1 and including an angled fitting connecting with the opened end of the tube means and provides for facilitating the alignment of said tube means with any debris to be removed from within the transmission pipe.

* * * * *